United States Patent
Levander et al.

(10) Patent No.: US 10,227,121 B2
(45) Date of Patent: Mar. 12, 2019

(54) PROPULSION SYSTEM FOR AQUATIC VESSELS

(71) Applicant: NORSEPOWER OY LTD, Helsinki (FI)

(72) Inventors: Kai Levander, Turku (FI); Tuomas Riski, Helsinki (FI); Heikki Juhani Huhtinen, Kaarina (FI)

(73) Assignee: NORSEPOWER OY LTD, Helsinki (FI)

( * ) Notice: Subject to any disclaimer, the term of this patent is extended or adjusted under 35 U.S.C. 154(b) by 385 days.

(21) Appl. No.: 15/034,972

(22) PCT Filed: Nov. 11, 2014

(86) PCT No.: PCT/FI2014/050847
§ 371 (c)(1),
(2) Date: May 6, 2016

(87) PCT Pub. No.: WO2015/071537
PCT Pub. Date: May 21, 2015

(65) Prior Publication Data
US 2016/0280347 A1 Sep. 29, 2016

(30) Foreign Application Priority Data

Nov. 17, 2013 (GB) .................................. 1320260.1

(51) Int. Cl.
*B63H 9/02* (2006.01)
*B63B 3/70* (2006.01)
(Continued)

(52) U.S. Cl.
CPC ................. *B63H 9/02* (2013.01); *B63B 3/70* (2013.01); *F16C 19/38* (2013.01); *F16C 23/08* (2013.01);
(Continued)

(58) Field of Classification Search
CPC .............. B63H 9/02; B63H 2023/0216; B63H 2023/0225; B63H 2023/0233; F03D 3/007
See application file for complete search history.

(56) References Cited

U.S. PATENT DOCUMENTS 1,674,169 A * 6/1928 Flettner .................... B63H 9/02
415/3.1
4,582,013 A * 4/1986 Holland, Jr. ............. B63H 9/02
114/39.3
(Continued)

FOREIGN PATENT DOCUMENTS

DE        255923 A1   4/1988
DE    102010040911 A1   3/2012
(Continued)

OTHER PUBLICATIONS

Kenneth C. Morisseau, "Marine Application of Magnus Effect Devices", Jan. 1985, Naval Engineers Journal, pp. 51-17.*
(Continued)

*Primary Examiner* — Ninh H. Nguyen
(74) *Attorney, Agent, or Firm* — Ziegler IP Law Group, LLC

(57) ABSTRACT

A propulsion system (102) for an aquatic vessel (100) is provided. The propulsion system includes a plurality of Magnus-type rotors (108) and a drive arrangement (147) for rotating the plurality of Magnus-type rotors. The plurality of Magnus-type rotors are operable to rotate about corresponding substantially upright axes. The propulsion system also includes a control arrangement (150) for controlling the drive arrangement to vary rates of rotations of the plurality of Magnus-type rotors. Each of the plurality of Magnus-type rotors includes a hollow region (116) therein. Each of the Magnus-type rotors is rotationally supported onto a support arrangement (118) which extends into the hollow region.
(Continued)

The drive arrangement includes at least one motor (148) disposed in the hollow region and located outside the support arrangement such that the at least one motor is accessible for maintenance. Furthermore, the at least one Magnus-type rotor includes a ventilation aperture arrangement (132) for enabling an upward movement of air to occur in operation within the at least one Magnus-type rotor for ventilating and cooling the drive arrangement and/or other internal components.

16 Claims, 13 Drawing Sheets

(51) Int. Cl.
  *F16C 19/38* (2006.01)
  *F16C 23/08* (2006.01)
  *B63H 23/02* (2006.01)
(52) U.S. Cl.
  CPC .. *B63H 2023/0216* (2013.01); *F16C 2326/30* (2013.01); *Y02T 70/58* (2013.01)

(56) References Cited

U.S. PATENT DOCUMENTS

| | | | |
|---|---|---|---|
| 8,230,798 B2* | 7/2012 | Rohden | ............ B63H 9/02 114/39.3 |
| 9,394,910 B2* | 7/2016 | Rohden | ............ B63H 9/02 |
| 2009/0217851 A1* | 9/2009 | Kind | ............ B63H 9/02 114/39.3 |
| 2013/0055944 A1 | 3/2013 | Poulsen | |
| 2013/0230399 A1 | 9/2013 | Rohden | |
| 2013/0236313 A1 | 9/2013 | Rohden | |
| 2013/0239859 A1 | 9/2013 | Rohden | |

FOREIGN PATENT DOCUMENTS

| | | |
|---|---|---|
| DE | 102010040919 A1 | 3/2012 |
| GB | 2477078 A | 7/2011 |
| JP | 2013538734 A | 10/2013 |
| WO | 2011098601 A1 | 8/2011 |
| WO | 2013110695 A1 | 8/2013 |
| WO | WO 2013110695 A1 * | 8/2013 ............ B63H 9/02 |

OTHER PUBLICATIONS

International Search Report, Application No. PCT/FI2014/050847, dated Apr. 2, 2015, 9 pages.
Great Britain Search Report, Application No. GB1320260.1, dated May 12, 2014, 1 page.
International Preliminary Report on Patentability, Application No. PCT/FI2014/050847, dated Nov. 5, 2015, 6 pages.
Notification of ground of rejection, Japan Patent Office, Application No. 2016-551054, dated Feb. 7, 2017, 6 pages.

* cited by examiner

PROPULSION SYSTEM FOR AQUATIC VESSELS

TECHNICAL FIELD

The present disclosure generally relates to propulsion systems for aquatic vessels, for example to propulsion systems employing Magnus-type rotors for propelling aquatic vessels. Moreover, the present invention relates to methods of installing the propulsion systems into the aquatic vessels.

BACKGROUND

Recently, attempts are being made in marine industry to utilize wind power to propel aquatic vessels. A conventional propulsion system for an aquatic vessel includes one or more submerged propellers for propelling the aquatic vessel, and may further include multiple Magnus rotors for supplementing the propellers. The Magnus rotors are operable rotate about corresponding substantially upright axes to produce a Magnus effect for propelling the aquatic vessel. The Magnus effect is defined as a thrust acting on a rotating body in a moving airstream, such as wind, wherein the thrust acts perpendicularly to a direction of the moving airstream.

Magnus rotors are conveniently rotated by employing associated motors disposed internally within the Magnus rotors. During operation, the motors generate heat, thus requiring ventilation and/or cooling to lower a temperature of the motors. However, implementations of known Magnus rotors locate associated motors in restricted spaces, resulting in the motors being insufficiently ventilated and/or cooled. Moreover, the implementations of known Magnus rotors are problematic for servicing personnel, when accessing associated motors or other internal components of the Magnus rotors during service or overhaul routines.

Assembly and installation of the known Magnus rotors onto a deck of an aquatic vessel is potentially tedious and cumbersome on account of specific constructional limitations of such aquatic vessels. Therefore, in view of aforesaid problems in relation to known Magnus rotor propelled aquatic vessels, there exists a need for a Magnus rotor propulsion system that is capable of being easily retro-fitted onto existing aquatic vessels while providing ease of access to service personnel to motors and/or other internal components of the Magnus rotor propulsion system. Furthermore, there also exists a need for a propulsion system that facilitates improved ventilation and/or cooling of components therein, in contradistinction to known propulsion systems.

BRIEF SUMMARY

The present disclosure seeks to provide an improved propulsion system for an aquatic vessel.

The present disclosure also seeks to provide an improved method of installing a propulsion system into an aquatic vessel.

In one aspect, embodiments of the present disclosure provide a propulsion system for an aquatic vessel. The propulsion system includes a plurality of Magnus-type rotors and a drive arrangement for rotating the plurality of Magnus-type rotors. The plurality of Magnus-type rotors are operable to rotate about corresponding substantially upright axes, thereby producing in operation a Magnus effect to propel the aquatic vessel. The Magnus effect is defined as a thrust acting on a rotating body in a moving airstream, such as wind, wherein the thrust acts substantially perpendicularly to a direction of the moving airstream.

Optionally, the propulsion system also includes a control arrangement for controlling the drive arrangement to vary rates and/or directions of rotations of the plurality of Magnus-type rotors. The rates of rotations of the plurality of Magnus-type rotors are, for example, speeds and/or directions of rotation of the individual Magnus-type rotors.

Essentially, at least one Magnus-type rotor includes a hollow region therein. The at least one Magnus-type rotor is rotationally supported onto a support arrangement which extends into the hollow region. The drive arrangement includes at least one motor disposed in the hollow region and located outside the support arrangement such that the at least one motor is accessible for maintenance.

Optionally, the at least one motor is coupled via a belt drive arrangement, a chain drive arrangement or a gear arrangement to the at least one Magnus-type rotor for rotating the at least one Magnus-type rotor in operation to propel the aquatic vessel.

Essentially, the at least one Magnus-type rotor includes a ventilation aperture arrangement for enabling an upward movement of air to occur in operation within the at least one Magnus-type rotor for ventilating and cooling the drive arrangement and/or other internal components.

Optionally, the at least one Magnus-type rotor is elongate and includes an upper portion which is supported onto a first bearing arrangement disposed between the at least one Magnus-type rotor and the support arrangement, and a lower end of the support arrangement extends to a foundation installed on a deck region of the aquatic vessel and includes a second bearing arrangement which supports the at least one Magnus-type rotor in a lateral direction.

Optionally, the supporting arrangement includes an upper portion which contains the first bearing arrangement, which bears a weight of the at least one Magnus-type rotor in a substantially vertical direction and also supports an upper part of the at least one Magnus-type rotor substantially laterally.

Optionally, the support arrangement is elongate and its lower portion is supported onto a foundation, which is fitted on the deck region of the aquatic vessel, and at a lower end of the support arrangement there is located a bearing arrangement, wherein the bearing arrangement includes three or more bearing wheels or rollers, and supports the at least one Magnus-type rotor at its lower part.

Optionally, the first bearing arrangement is operable to bear a majority of a weight of the at least one Magnus-type rotor, and the second bearing arrangement is operable to accommodate lateral movement of the lower end of the at least one Magnus-type rotor, such that the at least one Magnus-type rotor is operable to be able to pivot about the first bearing arrangement.

Optionally, the first bearing arrangement includes at least two sets of roller bearings wherein the sets of roller bearings have their axes of rotation angularly disposed so as to enable pivoting of the at least one Magnus-type rotor in operation about the first bearing arrangement, but substantially hindering lateral movement of the at least one Magnus-type rotor relative to the support arrangement.

Optionally, the second bearing arrangement includes a configuration of resiliently-mounted bearing wheels or rollers which are retractable for enabling the support arrangement to be installed into and removed from the aquatic vessel.

Optionally, the at least one Magnus-type rotor has a specific diameter and length, for example, the diameter of the at least one Magnus-type rotor is in a range of 2.5 meters to 5.0 meters while the height of the at least one Magnus-type rotor is in a range of 15 meters to 30 meters.

Optionally, the at least one motor of the drive arrangement is operable to supply in a range of 50 kW to 300 kW mechanical drive power to the at least one Magnus-type rotor when the propulsion system is employed to propel the aquatic vessel.

Optionally, the at least one Magnus-type rotor includes one or more ventilation blades and/or plurality of apertures allowing exchange of the upward movement of air and/or at least one service opening at an upper region thereof.

In another aspect, embodiments of the present disclosure provide a method of installing a propulsion system into an aquatic vessel. The method includes installing or retrofitting onto a deck region of the aquatic vessel a foundation, on which a support structure including the a first bearing arrangement above a second bearing arrangement, wherein the first bearing arrangement is operable substantially to bear downwardly-directed forces and the second bearing arrangement is operable substantially to bear lateral forces. The method further includes optionally arranging for lateral-restraining components of the second bearing arrangement to be in a retracted state. The method further includes optionally lowering the support arrangement onto the support structure for engaging with the second bearing arrangement, and arranging for the second bearing arrangement to be in a non-retracted state so as to engage onto the lower end of the support arrangement. The method further includes lowering the at least one Magnus-type rotor onto the first and the second bearing arrangements disposed in association with the support arrangement, so that the at least one Magnus-type rotor is operable to rotate about the support arrangement.

Optionally, the method includes coupling at least one motor of a drive arrangement between the at least one Magnus-type rotor and the support arrangement for rotating the at least one Magnus-type rotor relative to the support arrangement, wherein a hollow region of the at least one Magnus-type rotor is rotationally supported onto the support arrangement which extends into the hollow region. Optionally, the at least one motor of the drive arrangement is disposed in the hollow region and located outside the support arrangement such that the at least one motor is accessible for maintenance.

Moreover, the method includes engaging the second bearing arrangement by pivotally and/or laterally and/or radially moving a configuration of bearing wheels from a retracted state to an engaged state, wherein the bearing wheels engage onto a lower end of the at least one Magnus-type rotor.

In yet another aspect, embodiments of the present disclosure provide an elongate support arrangement, wherein a lower end of the support arrangement extends into a foundation installed on a deck region of an aquatic vessel.

Moreover, a first bearing arrangement of the elongate support arrangement is operable to bear a majority of a weight of at least one Magnus-type rotor, and a second bearing arrangement is operable to restrain lateral movement of a lower end of the support arrangement, wherein the at least one Magnus-type rotor is operable to be able to pivot about the first bearing arrangement.

Optionally, the at least one Magnus-type rotor includes a hollow region therein, and is rotationally supported onto the support arrangement which extends into the hollow region, wherein at least one motor of the drive arrangement is disposed in the hollow region and located outside the support arrangement such that the at least one motor is accessible for maintenance.

Optionally, the second bearing arrangement includes the configuration of resiliently-mounted bearing wheels or rollers which are retractable for enabling the at least one Magnus-type rotor to be installed into and removed from the aquatic vessel.

More optionally, the configuration of resiliently-mounted bearing wheels or rollers includes one or more wheels or rollers which are rotatably mounted onto adjustable arms.

Optionally, the first bearing arrangement includes two sets of roller bearings having their respective axes of rotation angularly disposed to each other to enable pivoting of the at least one Magnus-type rotor in operation about the first bearing arrangement. The two sets of roller bearings are further configured to hinder lateral movement of the at least one Magnus-type rotor relative to the support arrangement.

Embodiments of the present disclosure address the aforementioned problems associated with the prior art. Moreover, embodiments of the present disclosure are capable of providing e adequate ventilation and/or cooling to the motor and other internal components. Furthermore, embodiments of the present disclosure enable service personnel to access the motor and other internal components more easily. The motor can be, for example, changed more easily by lifting the Magnus-type rotor away. Further embodiments enable easier maintenance of bearings, motors and belt drives. Belt drive maintenance is made easier due to a location of a vertical axis of the motor, axis and the vertical axis of the bearing arrangements being at mutually different positions in a lateral direction.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
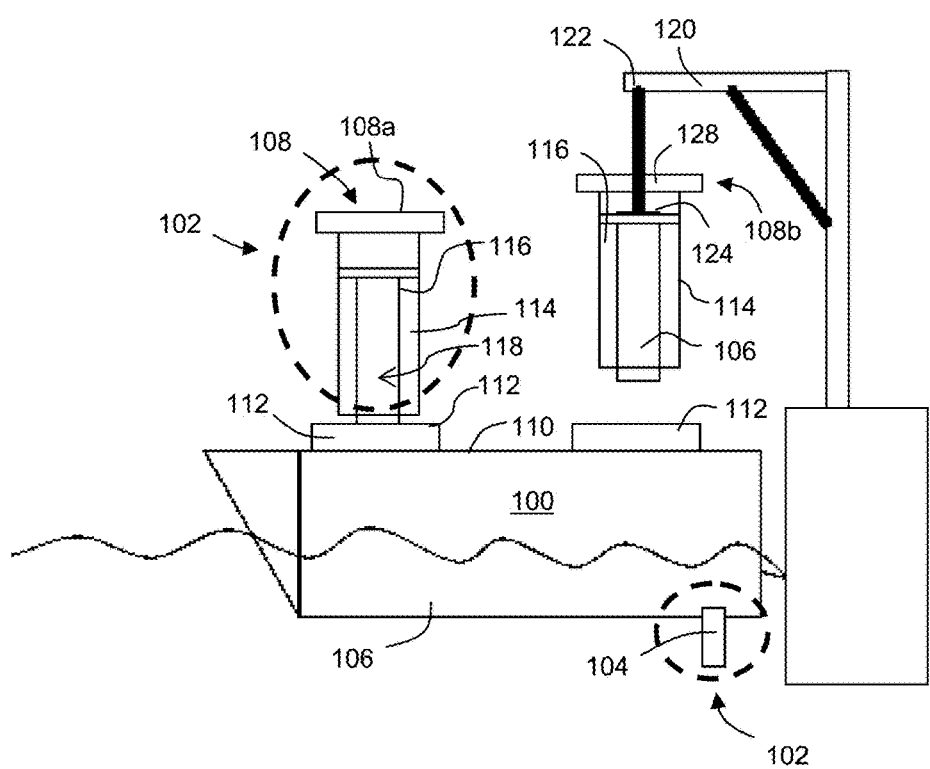
FIG. 1 is a schematic illustration of a propulsion system for an aquatic vessel, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which it can be implemented. Although the best mode of carrying out the present disclosure has been disclosed, persons skilled in the art would recognize that other embodiments for carrying out or practicing the present disclosure are also possible.

Embodiments of the present disclosure provide a propulsion system for an aquatic vessel. The propulsion system includes a plurality of Magnus-type rotors and a drive arrangement for rotating the plurality of Magnus-type rotors. The plurality of Magnus-type rotors are operable to rotate about corresponding substantially upright axes, thereby producing a Magnus effect to propel the aquatic vessel. The Magnus effect is herewith defined as a thrust acting on a rotating body in a moving airstream, such as wind, wherein the thrust acts substantially perpendicularly to a direction of the moving airstream.

The propulsion system also includes a control arrangement for controlling the drive arrangement to vary rates of rotations of the plurality of Magnus-type rotors. The rates of rotations of the plurality of Magnus-type rotors are, for example, speeds and/or directions of rotation of the individual Magnus-type rotors.

Moreover, at least one Magnus-type rotor includes a hollow region therein. The at least one Magnus-type rotor is rotationally supported onto a support arrangement which extends into the hollow region. Furthermore, the drive arrangement includes at least one motor disposed in the hollow region and located outside the support arrangement such that the at least one motor is accessible for maintenance.

Moreover, the at least one motor is coupled via a belt drive arrangement, and chain drive arrangement and/or a gear arrangement, to the at least one Magnus-type rotor for rotating the at least one Magnus-type rotor in operation to propel the aquatic vessel. Alternative approaches for coupling the at least one motor to the at least one Magnus-type rotor are feasible, for example using high-pressure hydraulic coupling.

Moreover, the at least one Magnus-type rotor includes a ventilation aperture arrangement for enabling an upward movement of air to occur in operation within the at least one Magnus-type rotor for ventilating and cooling the drive arrangement and/or other internal components.

Moreover, the at least one Magnus-type rotor is elongate and includes an upper portion which is supported onto a first bearing arrangement disposed between the at least one Magnus-type rotor and the support arrangement, and a lower end of the support arrangement extends to a foundation installed on a deck region of the aquatic vessel and supports a second bearing arrangement.

Moreover, the first bearing arrangement is operable to bear a majority of a weight of the at least one Magnus-type rotor, and the second bearing arrangement is operable to restrain lateral movement of the lower end of the at least one Magnus-type rotor, such that the at least one Magnus-type rotor is operable to be able to pivot about the first bearing arrangement.

Optionally, the first bearing arrangement includes two sets of roller bearings, wherein the sets of roller bearings have their axes of rotation angularly disposed so as to enable pivoting of the at least one Magnus-type rotor in operation about the first bearing arrangement, but substantially hindering lateral movement of the at least one Magnus-type rotor relative to the support arrangement.

Optionally, the second bearing arrangement includes a configuration of resiliently-mounted bearing wheels and/or bearing rollers, which are retractable for enabling the support arrangement to be installed into and removed from the aquatic vessel.

Optionally, the at least one Magnus-type rotor has a specific diameter and length; for example, the diameter of at least one Magnus-type rotor is in a range of 2.5 meters to 7.0 meters, such as from 2.5 meters to 5.0 meters, while the length is in a range of 15 meters to 40 meters, such as from 15 meters to 30 meters.

Optionally, the at least one motor of the drive arrangement is operable to supply in a range of 50 kW to 300 kW mechanical drive power to the at least one Magnus-type rotor when the propulsion system is employed to propel the aquatic vessel.

Moreover, the at least one Magnus-type rotor includes one or more ventilation and/or plurality of apertures allowing exchange of the upward movement of air blades and/or at least one service opening at an upper region thereof.

According to an embodiment, the cylindrical body has, on its inner surface, a raceway, for allowing movement of the bearing wheel or roller. The raceway may be removable so that it can be replaced if or when it is worn out. The raceway protects the cylindrical body against wear. Indeed, when the bearing wheel or roller is made of metal and the cylindrical body is made of a composite material, the cylindrical body may be worn out by the metallic bearing wheels or rollers. In addition the cylindrical body might worn out even if the bearing wheel or roller is made from composite material or rubber. Thus the raceway increases the resistance of the structure, and as the raceway can be made removable, it can be replaced when required. Furthermore, the raceway may also comprise a layer of insulating material such as rubber or similar, to attenuate noise and vibrations. The raceway and the insulating material may be arranged to each other and to the cylindrical body by any known manner, for example by gluing.

The cylindrical body may be made of a composite material comprising a plastic material and reinforcing fibres. For example, it may be made from Fiberglass Reinforced Plastics materials (FRP), Carbon Reinforced Plastics materials (CRP), Glass Reinforced Plastics materials (GRP), Aramid reinforced plastics materials, Basalt reinforced plastics materials or any combination thereof.

Embodiments of the present disclosure are suitable for aquatic vessels such as, but not limited to, passenger ships, cargo ships, special-purpose ships, and boats.

Referring now to the drawings, particularly by their reference numbers, FIG. 1 is a schematic illustration of an aquatic vessel 100 employing a propulsion system 102 in accordance with an embodiment of the present disclosure. The propulsion system 102 optionally includes one or more propellers 104 located on an underside of a hull 106 of the aquatic vessel 100. The one or more propellers 104 optionally include, for example, axial thrusters, or are optionally of a type commonly known in the art. These propellers 104 are optionally mounted at a bow and/or a stern of the aquatic vessel 100.

Moreover, the propulsion system 102 also includes a plurality of Magnus-type rotors 108, depicted as a Magnus-type rotor 108a, and a Magnus-type rotor 108b, hereinafter collectively referred to as Magnus-type rotors 108. The Magnus-type rotors 108 are spatially positioned at various positions of a deck region 110 of the aquatic vessel 100. For example, the Magnus-type rotors 108 are spatially positioned in proximities of corners of the deck region 110, namely at port and starboard sides of a bow and a stern of the aquatic vessel 100. Alternatively, the Magnus-type rotors 108 are spatially positioned in proximity of a middle portion of the deck region 110, the stern region, or the bow region of the aquatic vessel 100. The Magnus-type rotors 108 may be suitably positioned depending on, for example, a number of the Magnus-type rotors 108 that have installed onto the deck region 110 of the aquatic vessel 100, a size of the Magnus-type rotors 108, and/or a size and/or shape of the aquatic vessel 100.

In an embodiment of the present disclosure, each of the Magnus-type rotors 108 optionally has a diameter in a range of 2.5 meters to 5.0 meters. Moreover, the Magnus-type rotors 108 optionally have a height in a range of 15 meters to 30 meters. For example, the Magnus-type rotors 108 have a diameter of substantially 3 meters and a height of substantially 20 meters.

The Magnus-type rotor 108 is installed onto a foundation 112 provided on the deck region 110 of the aquatic vessel 100. The Magnus-type rotors 108 include a cylindrical body 114 including a hollow region 116 defined therein. The propulsion system 102 includes a support arrangement 118 extending within the hollow region 116 of the cylindrical body 114. The support arrangement 118 is optionally elongated and is configured to support rotatably the cylindrical body 114 of the Magnus-type rotor 108, as will be explained hereinafter.

Referring to FIG. 1, the Magnus-type rotor 108 is shown being installed onto the foundation 112 by employing a crane 120 to lift the Magnus-type rotor 108. The crane 120 disclosed herein, is optionally, for example, a tower crane, a gantry crane, or any suitable lifting apparatus known to a person ordinary skilled in the art. In continued reference to FIG. 1, it can be seen that a cable 122 of the crane 120 is coupled to a support plate 124 associated with the support arrangement 118 in order to hoist the Magnus-type rotor 108b and lower the Magnus-type rotor 108b onto the foundation 112. The support plate 124 optionally includes eye-bolts 126a (not shown in FIG. 1, but shown in FIG. 3C) rigidly attached thereon. The eye-bolts 126a are optionally configured to allow coupling of the top plate 128 with the cable 122 of the crane 120. However, alternative structures and methods are optionally employed for installing the Magnus-type rotor 108 onto the foundation 112.

FIG. 1 is merely an example, which should not unduly limit the scope of the claims herein. It is to be understood that the specific designation for the propulsion system 102 is for the exemplary purposes and is not to be construed as limiting the propulsion system 102 to specific numbers, types, or arrangements of the Magnus-type rotors 108 and/or other components of the propulsion system 102. One ordinarily skilled in the art will recognize many variations, alternatives, and modifications of embodiments of the present disclosure.

Figure 2:
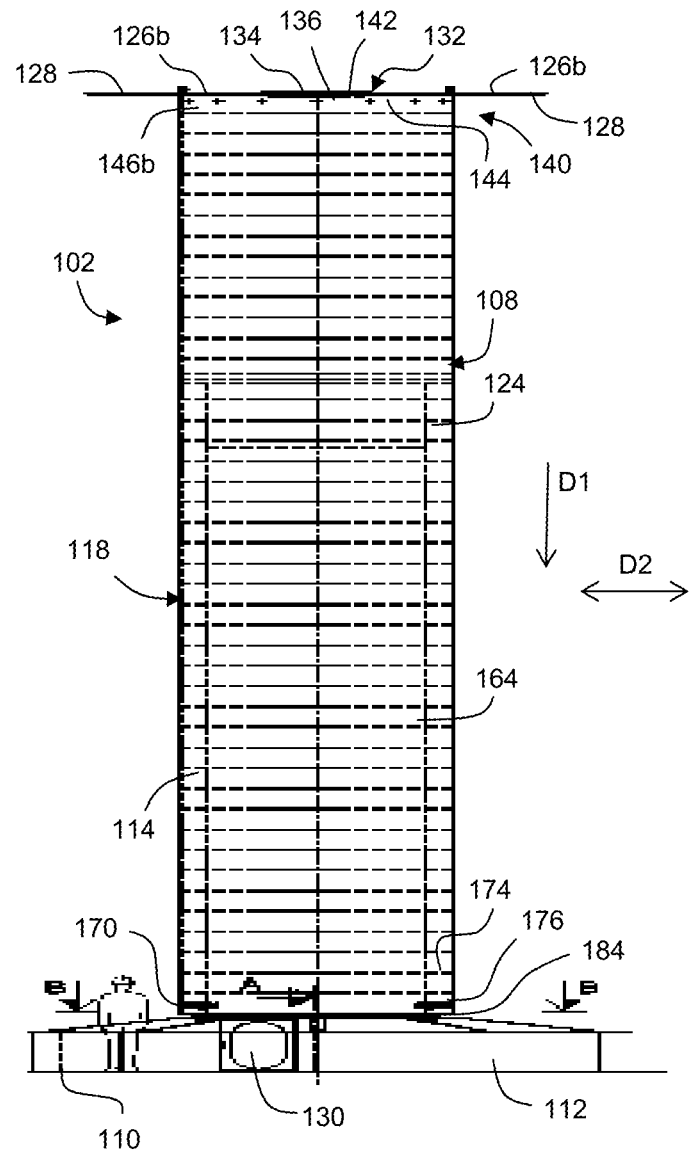
FIG. 2 is a front elevation view of a Magnus-type rotor employed in the propulsion system of FIG. 1.

Referring next to FIG. 2, the Magnus-type rotor 108 optionally further includes a top plate 128 disposed above the cylindrical body 114. In an embodiment, the top plate 128 is optionally provided with eye-bolts 126b thereon. The eye-bolts 126b of the top plate 128 are optionally provided with alternate points of coupling to the crane 120 and assist during hoisting and lowering of the Magnus-type rotor 108 onto the foundation 112. With reference to the preceding two embodiments, the rigid attachment of the eye-bolts 126a/126b to the support plate 124 and/or the top plate 128 is optionally accomplished in various manners, such as bolting, welding or by other methods commonly known in the art.

With continued reference to the preceding two embodiments, it will be appreciated that the eye-bolts 126a on the support plate 124 or the top plate 128 are used to couple with the crane 120 individually such that the support arrangement 118 and the cylindrical body 114 are susceptible to being hoisted and lowered individually onto the foundation 112. Alternatively, the eye-bolts 126a/126b on any one or more of the support plate 124 or the top plate 128 are used collectively to hoist and lower the Magnus-type rotor 108 in its entirety onto the foundation 112. Moreover, although eye-bolts 126a/126b are disclosed herein, it is to be appreciated that any suitable coupling structure such as, but not limited to, hooks may be employed in lieu of the eye-bolts 126a/126b to allow coupling of the top plate 128 or the support plate 124 to the cable 122 of the crane 120. Therefore, the eye-bolts 126a/126b disclosed herein are merely exemplary in nature and hence, non-limiting of this disclosure.

As shown in FIG. 2, the foundation 112 beneficially include an opening 130 configured to allow service personnel to access internal components of the Magnus-type rotor 108. The opening 130 is beneficially suitably sized and shaped to enable service personnel to enter more easily into and exit from the Magnus-type rotor 108 and accomplish or perform servicing of components located within the Magnus-type rotor 108.

Figure 3A:
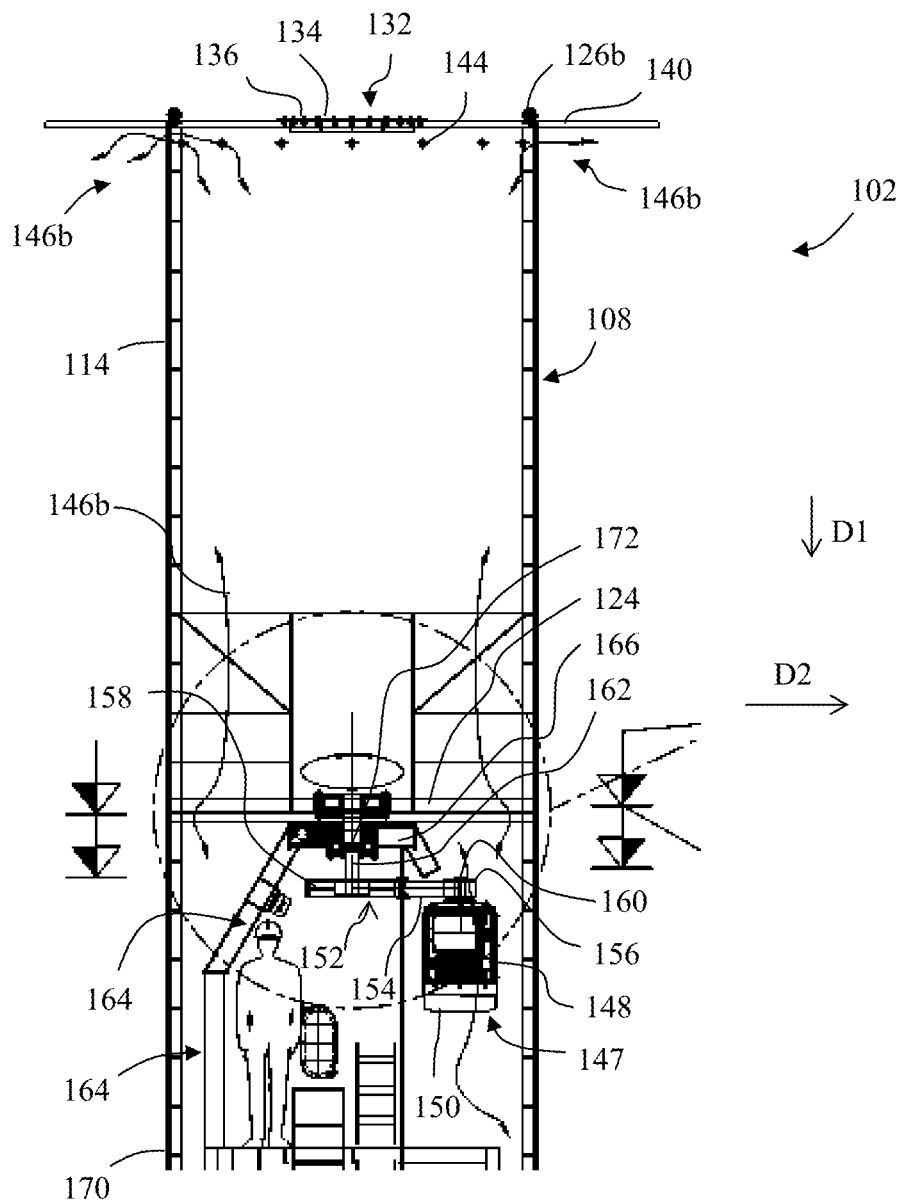
FIGS. 3A and 3B are front and top sectional views of the Magnus-type rotor in accordance with an embodiment of the present disclosure.

Further, each of the Magnus-type rotors 108 includes a ventilation aperture arrangement 132 for enabling an upward movement of air 146a to occur in operation within the at least one Magnus-type rotor 108 such that the upward movement of air 146*b* is configured to cool a drive arrangement 147 (as shown in FIG. 3A) and/or other internal components of the Magnus-type rotor 108. In an embodiment as shown in FIG. 2, the ventilation aperture arrangement 132 is optionally provided in the top plate 128 disposed on the cylindrical body 114. The ventilation aperture arrangement 132 optionally includes a plurality of apertures 134 configured to allow exchange of the upward movement of air 146*b* into and out of the cylindrical body 114 of the Magnus-type rotor 108 with respect to ambient atmosphere.

Furthermore, the Magnus-type rotor 108 optionally includes one or more ventilation blades 136 at an upper region 140 thereof. In the embodiment of FIG. 2, the ventilation blades 136 are shown radially arranged at a centre of the top plate 128 and connected thereto. The ventilation blades 136 are configured to direct the upward movement of air 146*b* in an upwards direction, independently of a direction of rotation of the Magnus-type rotor 108. In one exemplary embodiment, the ventilation blades 136 are turned depending on a change in direction of rotation of the cylindrical body 114. In another exemplary embodiment, the ventilation blades 136 are constructed and arranged such that the angle of attack offered to the egressing air 146*b* remains unchanged and is configured to force the air 146*a* outward from within the Magnus-type rotor 108.

In an embodiment, the top plate 128 of the Magnus-type rotor 108 optionally additionally includes at least one service opening 142 defined therein. The service opening 142 is beneficially located adjacent to the ventilation blades 136 and is configured to allow service personnel to access internal components of the Magnus-type rotor 108. As is the case with the opening 130 provided at the foundation 112, the service opening 142 at the upper region 140 of the Magnus-type rotor 108 is also suitably sized and shaped, so as to enable the service personnel to enter more easily into and exit from the Magnus-type rotor 108 during service and/or overhaul routines.

Additionally, the upper region 140 of the cylindrical body 114 optionally includes one or more holes 144 defined therethrough. The holes 144 are optionally radially arranged on a circumference of the cylindrical body 114 and are configured to ventilate and/or provide cooling of components disposed within the Magnus-type rotor 108. A size and number of the holes 144 are beneficially appropriately selected, such that a pre-determined amount of ventilation and/or cooling is achieved therethrough by exchange of the upward flow of air 146*b* into and from the cylindrical body 114 of the Magnus-type rotor 108. For example, sixteen holes 144 of 50 mm diameter each are radially arranged and located around the circumference of the cylindrical body 114.

As shown in FIG. 3A, the drive arrangement 147 is configured to rotate the at least one Magnus-type rotor 108. The drive arrangement 147 includes a motor 148 corresponding to each Magnus-type rotor 108, so as to be operable to actuate individually the motor 148 to vary a rate of rotation of its corresponding Magnus-type rotor 108. Each of the motors 148 are beneficially operable to supply mechanical drive power and rotate the Magnus-type rotors 108 about their corresponding substantially upright axes when the propulsion system 102 is employed to propel the aquatic vessel 100. In an embodiment of the present disclosure, the mechanical drive power supplied by each of the motors 148 to the corresponding Magnus-type rotors 108 is in a range of 50 kW to 300 kW.

The propulsion system 102 further includes a control arrangement 150 coupled to the drive arrangement 147. The control arrangement 150 is beneficially configured to control the drive arrangement 147 for varying rates of rotation of the at least one Magnus-type rotor 108. The control arrangement 150 is, for example, implemented using one or more computing devices that include computing hardware, which are operable to execute one or more software products recorded on non-transitory, namely non-transient, machine-readable data storage media. Typical examples of the computing devices include, although are not limited to, a Personal Computer (PC), a handheld PC, a desktop computer, a laptop computer, a tablet computer, a phablet computer, an Ultra-Mobile Personal Computer (UMPC), and a smart telephone. Therefore, the drive arrangement 147 and the control arrangement 150 are beneficially configured together to rotate selectively, and vary a rate of rotation, of the individual Magnus-type rotors 108 during operation of the aquatic vessel 100.

In order to perform their respective operations, various components of the propulsion system 102 beneficially receive electricity from an electrical grid (not shown in FIG. 1) of the aquatic vessel 100. Electricity may be typically generated by an engine (not shown in FIG. 1) of the aquatic vessel 100 and stored in an energy storage arrangement (not shown) coupled to the electrical grid.

Figure 3B:
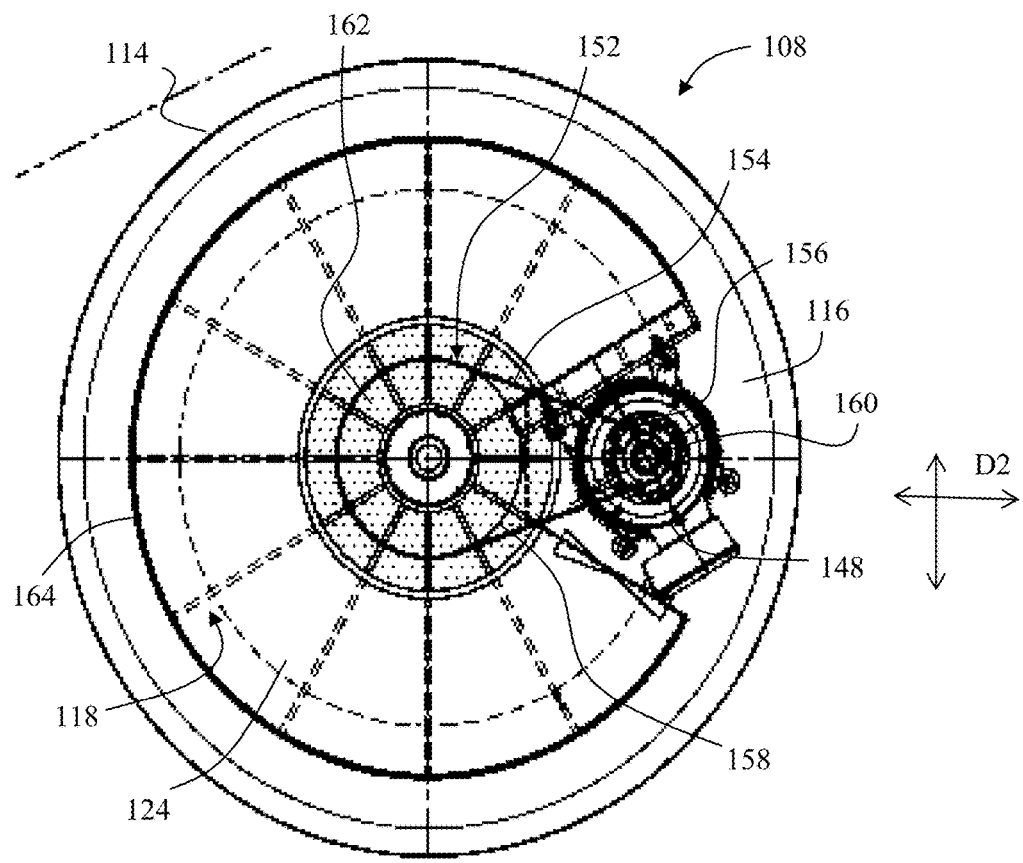

With reference to FIGS. 3A and 3B, the motor 148 of the drive arrangement 147 is included in the hollow region 116 of the cylindrical body 114 and lies outside the support arrangement 118 such that the motor 148 is accessible for maintenance. The motor 148 is disposed in fluidic, for example airflow, communication with the holes 144 on the cylindrical body 114 such that ventilation and/or cooling of the motor 148 may be accomplished by heat exchange via the upward flow of air 146*b* into and out of the cylindrical body 114 with respect to ambient atmosphere. Moreover, the motor 148 is positioned in communication with the opening 130 of the foundation 112. The positioning of the motor 148 relative to the opening 130 together with the aforesaid fluidic communication defined there between may therefore, allow more easy access for service personnel during service and/or overhaul routines. As an example, in a normal operation, a normal maintenance of the motor 148 is conducted through the access hatch 130. The embodiments further enable changing the motor 148 by lifting the cylindrical body 114 up and removing the motor 148, for example when replacing the motor with a new replacement motor. This replacement is made possible by utilizing having the hollow region 116 disposed outside the support arrangement 118.

With continued reference to FIGS. 3A and 3B, it be appreciated that the motor 148 is coupled via a belt drive arrangement 152 to the Magnus-type rotor 108 for rotating the Magnus-type rotor 108, namely in practice the rotating body 114, in operation to propel the aquatic vessel 100. The belt drive arrangement 152 optionally includes a belt 154 looped around a first pulley 156 and a second pulley 158, wherein the first pulley 156 is rigidly connected to a drive shaft 160 of the motor 148 and the second pulley 158 is rigidly connected to an input shaft 162 associated with the support plate 124.

Figure 3C:
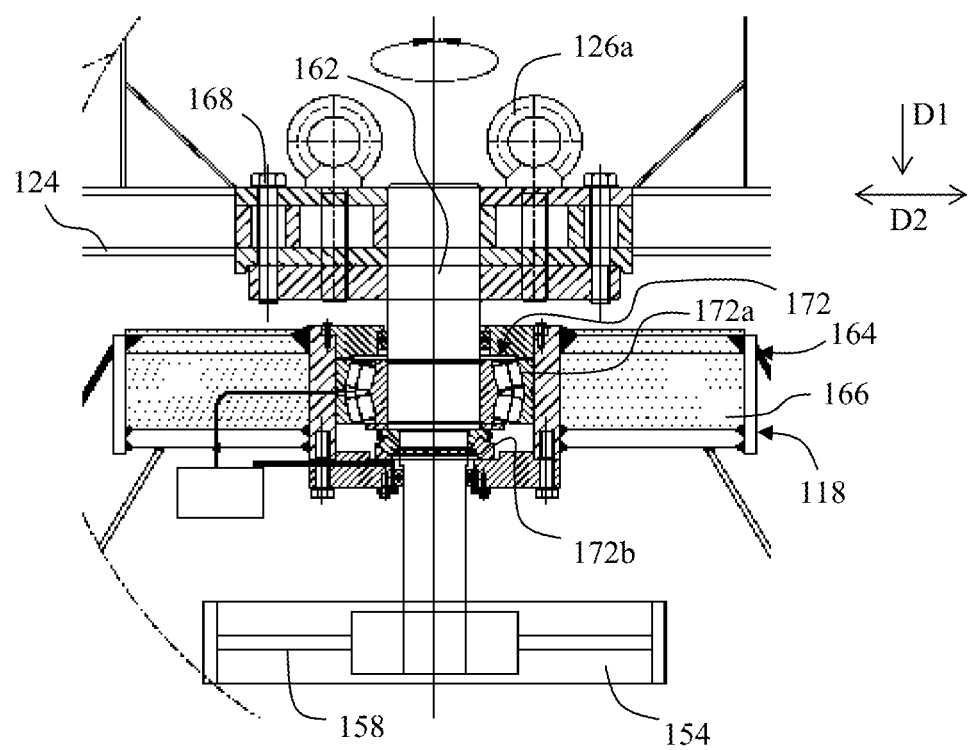
FIG. 3C is a front sectional view of a first bearing arrangement employed in the Magnus-type rotor of FIG. 3A.

As shown in FIG. 3C, the input shaft 162 associated with the support plate 124 extends downwardly to pass through a support tower 164 of the support arrangement 118 and is rigidly attach to the second pulley 158 located below a ceiling 166 of the support tower 164. As shown, the support plate 124 is beneficially releasably attached to the input shaft 162 by employing a set of bolts and nuts 168, whereas the second pulley 158 is beneficially releasably coupled to the input shaft 162 by, for example, but not limited to, a spline, or a key. Therefore, upon rotation of the drive shaft 160 by the motor 148, the first pulley 156, the belt 154, and the second pulley 158 rotate in unison to rotate the input shaft 162. Consequently, the support plate 124 in attachment with the input shaft 162 has imparted thereto a rotation from the input shaft 162 to rotate the cylindrical body 114 of the Magnus-type rotor 108. Therefore, the belt drive arrangement 152 is beneficially configured to transfer rotational energy from the motor 148 to the cylindrical body 114, such that the cylindrical body 114 rotates about the support arrangement 118 of the Magnus-type rotor 108.

With reference to FIGS. 3A and 3C, the cylindrical body 114 is elongate and includes a lower portion 170. The lower portion 170 of the cylindrical body 114 is rotatably supported onto a first bearing arrangement 172 of the propulsion system 102. The first bearing arrangement 172 includes one or more roller bearings 172a and thrust bearings 172b, collectively referred to as the first bearing arrangement 172, located between the input shaft 162 and the ceiling 166 of the support tower 164. The thrust bearings 172b are beneficially configured to support a weight of the cylindrical body 114 on the support tower 164 in a substantially vertical direction D1, while the roller bearings 172a are beneficially configured to provide support to the cylindrical body 114 in a substantially horizontal direction D2, referring to FIG. 2. The first bearing arrangement 172 is therefore operable to allow the cylindrical body 114 to rotate about the support tower 164. It will be appreciated that the first bearing arrangement 172 is configured to isolate the rotational energy of the input shaft 162 from being transmitted to the support tower 164, thereby allowing the support tower 164 to remain stationary while the cylindrical body 114 rotates about the support tower 164.

Figure 4:
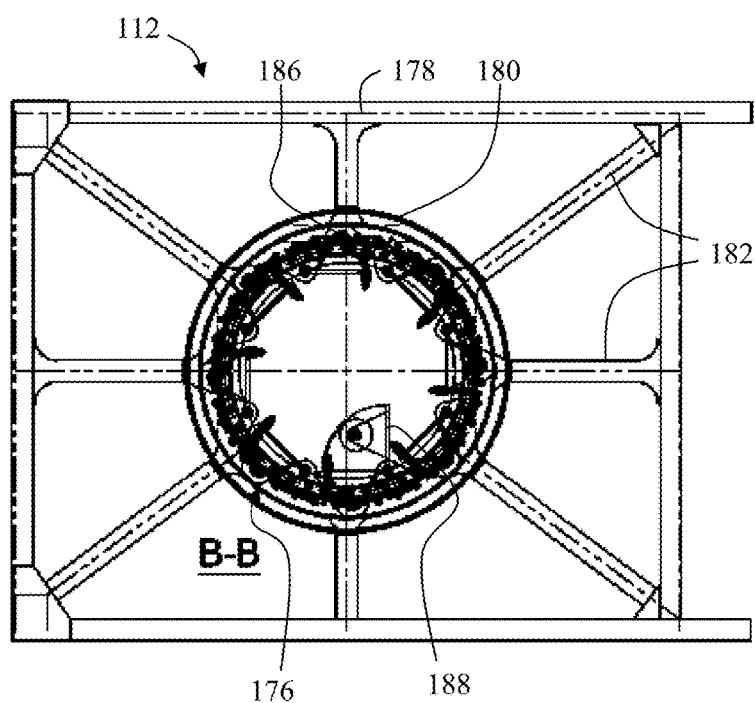
FIG. 4 is a view of a lower part of a support for installation of the Magnus-type rotor, and the foundation extending below of the support.

Referring to FIGS. 2 and 4, in an exemplary embodiment, a lower end 174 of the support arrangement 118 extends to the foundation 112 installed on the deck region 110, while a second bearing arrangement 176 is shown associated with the lower part of the support tower 164. The foundation 112, as disclosed earlier herein, is optionally welded to the deck region 110 of the aquatic vessel 100. In an exemplary configuration, the foundation 112 optionally includes a box-shaped structure 178, and a bearing receptacle 180 disposed therein. The bearing receptacle 180 is beneficially welded to the box-shaped structure 178 by interconnecting members 182. In a preferred embodiment, the interconnecting members 182 is positioned to overlay with reinforcement members (not shown) of the aquatic vessel 100 positioned below the deck region 110. The interconnecting members 182 are configured to provide rigidity to the foundation 112, such that the bearing receptacle 180 is capable of withstanding forces experienced by the weight and operation of the Magnus-type rotor 108.

In the embodiment of FIG. 4, the second bearing arrangement 176 is shown radially disposed within the bearing receptacle 180 and is operable to restrain lateral movement of a lower end 184 of the cylindrical body 114 of the Magnus-type rotor 108 relative to the bearing receptacle 180 or the deck region 110 of the aquatic vessel 100, referring to FIG. 2. The term "lateral movement" implies movement of the lower end 184 of the cylindrical body 114 of the Magnus-type rotor 108 in a substantially horizontal direction D2 as shown in FIG. 2. Restraining the lateral movement of the support tower 164 allows the Magnus-type rotor 108 to remain stable atop the foundation 112 such that the cylindrical body 114 is operable to pivot about the first bearing arrangement 172 during operation of the Magnus-type rotor 108. Although it is disclosed in the particular embodiment of FIG. 4 that the second bearing arrangement 176 is associated with the foundation 112, the second bearing arrangement 176 is optionally alternatively associated with the support tower 164 as will be described hereinafter in conjunction with FIGS. 5A, 5B, and 6.

Figure 5A:
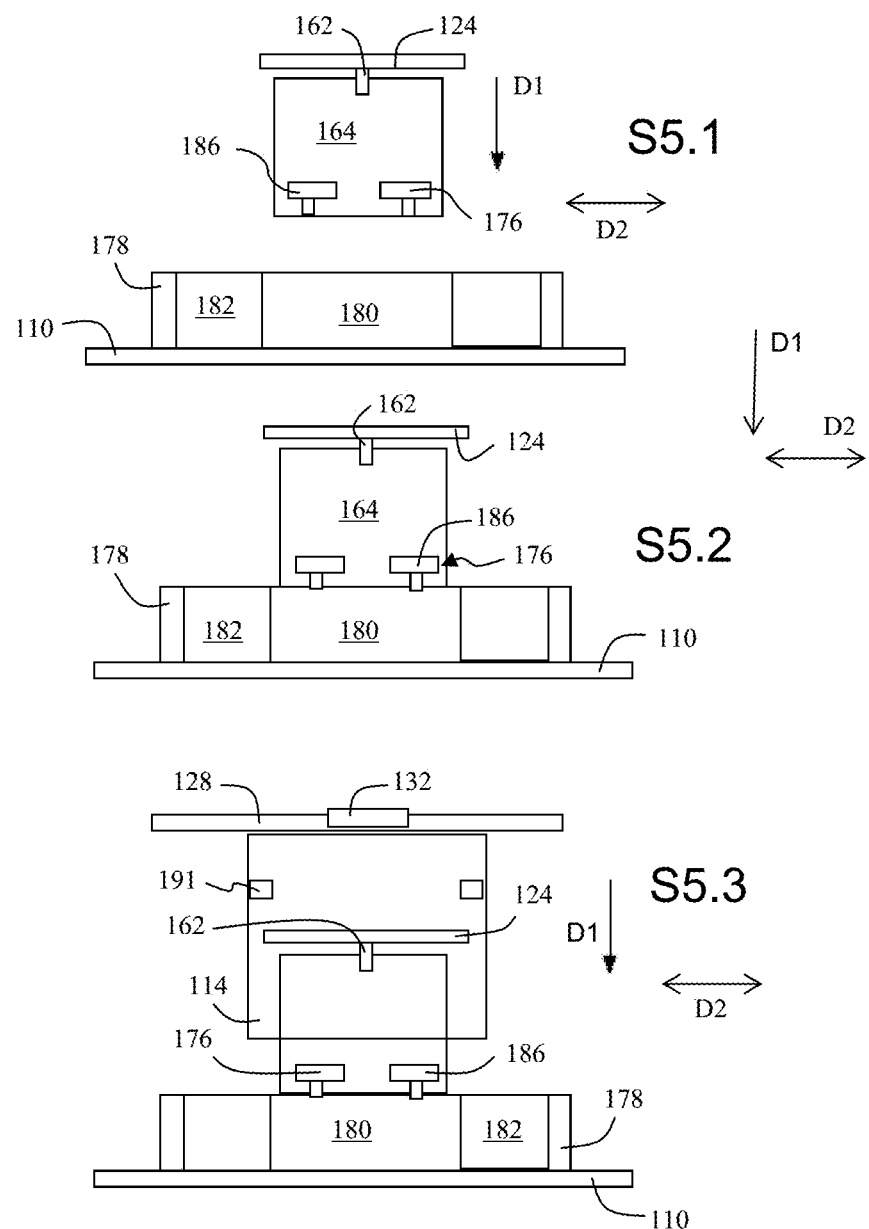
FIGS. 5A and 5B are schematic illustrations of a method of installing the Magnus-type rotor according to an embodiment of the present disclosure.
Figure 5B:
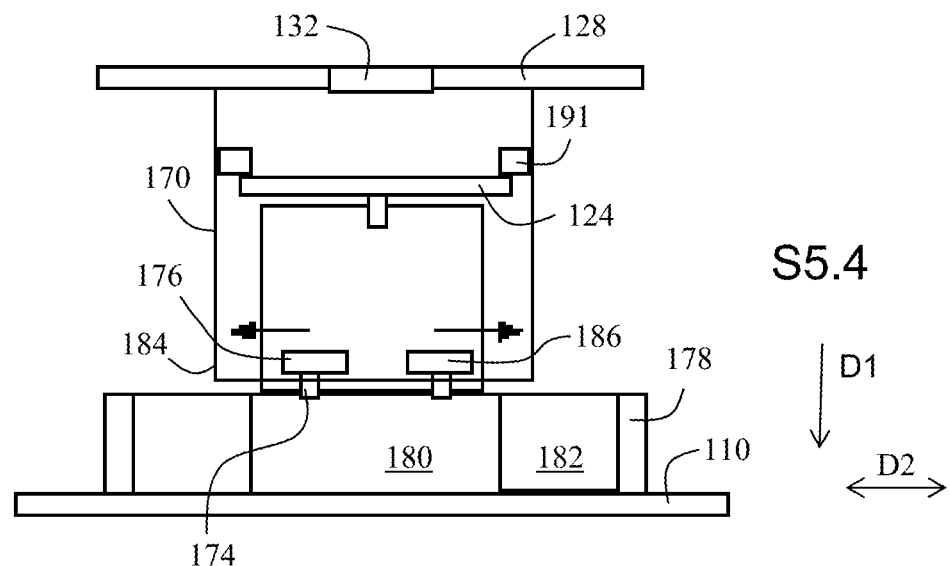
Figure 5B:
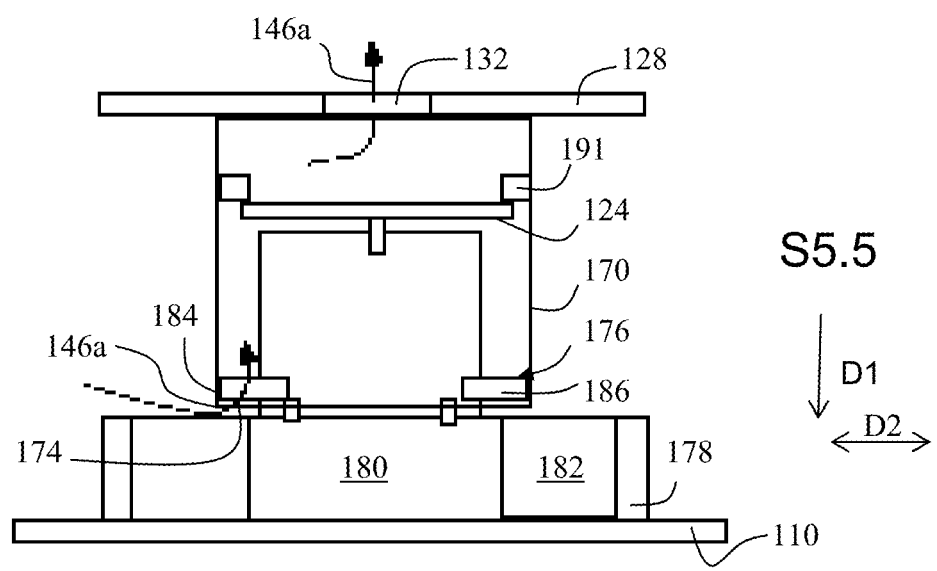
Figure 6A:
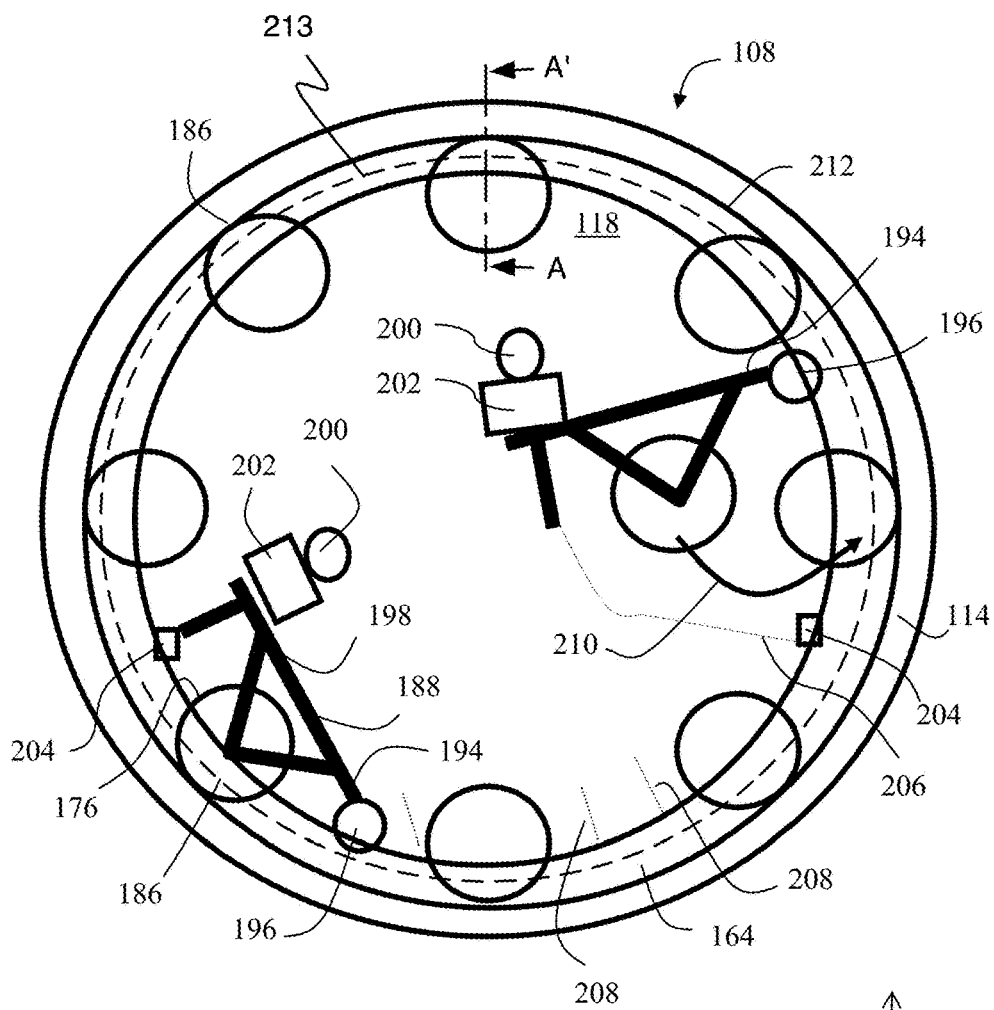
FIGS. 6A and 6B are a top plan view of resiliently-mounted bearing wheels included in an embodiment of the second bearing arrangement of the present disclosure and a cross-sectional view of the wheels along the lines A-A'.

Referring to FIGS. 5A, 5B, 6A and 6B, the second bearing arrangement 176 is optionally disposed at a lower end 174 of the support tower 164 and connected thereto. The second bearing arrangement 176 includes a configuration of resiliently-mounted bearing wheels or rollers 186 which are retractable for enabling the cylindrical body 114 to be installed onto and removed from the support tower 164. Only two bearing wheels 186 are illustrated in the FIGS. 5A, 5B, and eight bearing wheels 186 are illustrated in FIG. 6A; a number of bearing wheels 186 disclosed herein is merely exemplary in nature and hence, non-limiting of this disclosure. Any number of bearing wheels or roller 186 are optionally employed to form the second bearing arrangement 176.

Attention is presently drawn to FIG. 6A, wherein each of the bearing wheels or rollers 186 is shown connected to the support tower 164 by an arm 188. Moreover, the bearing wheels or rollers 186 are rotatably connected to the arm 188. The term "bearing wheel 186" employed to described embodiments of the disclosure beneficially collectively refers to a bearing disposed within a wheel (not shown). Therefore, the bearing wheel 186 is optionally configured to pivotally rotate on the arm 188. A first end 194 of the arm 188 is pivotally connected to the support tower 164 via a pivot pin 196. A second end 198 of the arm 188 includes a bolt 200 that is rotatably disposed within a bearing block 202. The bolt 200 is configured to threadably engage with an internally tapped hole 204 defined on the support tower 164. The tapped hole 204 is optionally located in alignment with an accurate trajectory 206 of the bolt 200 when the arm 188 is pivoted about the pivot pin 196. A number of such tapped holes 204 are optionally provided in the support tower 164 to correspond to the bolts 200 on the respective arms 188.

Moreover, the support tower 164 optionally includes a plurality of apertures 208 defined thereon. The apertures 208 are optionally located in a plane of the bearing wheel or roller 186 and positioned in alignment with an arcuate trajectory 210 of the corresponding bearing wheels 186. The apertures 208 are suitably sized and shaped to allow passage of the bearing wheels or rollers 186 therethrough, such that when the bolt 200 is threadably engaged with the tapped hole 204, the bearing wheel 186 on the associated arm 188 is disposed partially or completely outside the support tower 164 to contact with an inner surface 212 of the cylindrical body 114. The contact established between the bearing wheel or roller 186 and the inner surface 212 of the cylindrical body 114 is beneficially a rolling type of contact, wherein the bearing wheel or roller 186 is configured to execute a rolling motion against the inner surface 212 upon rotation of the cylindrical body 114. Moreover, to adjust a force of the contact, the bolt 200 is beneficially tightened or loosened relative to the tapped hole 204 on the support tower 164. Moreover, by tightening or loosening individual arms 188 of the second bearing arrangement 176, an alignment of the cylindrical body 114 with respect to the support tower 164 is easily adjusted. Furthermore, the bearing blocks 202 may be provided with springs therein (not shown). The springs may serve to axially bias the corresponding bolts 200 away from the tapped holes 204 and prevent inadvertent movement of the bolts 200 relative to the tapped holes 204. Therefore, the springs help to secure the bolts 200 at their respective desired positions relative to the tapped holes 204. In addition, the springs help to smoothen and to balance the movement and possible vibrations of the cylindrical body 114.

With reference to the arm 188 disclosed herein, the retractable functionality thereof is beneficial to operating and/or service personnel when assembling the cylindrical body 114 over the support tower 164. Moreover, the retractable functionality of the arms 188 beneficially allows service personnel to replace the bearing wheels or rollers 186 in situations such as, but not limited to, when the bearing wheels or rollers 186 are damaged, broken or worn out. Optionally, in order beneficially to improve a service life of the bearing wheels or rollers 186, the wheels or rollers, and the bearings therein, are manufactured from materials which are optimally resistant to wear, friction, abrasion, and/or other detrimental effects typically experienced from forces of the rolling contact. Some examples of sturdy and/or light-weight materials for the wheels and the bearings optionally include, for example, Aluminium and rubber respectively. However, many other materials which are commonly known in the art are beneficially used to form the wheels or rollers 186, and the bearings of the bearing wheels or rollers 186.

Figure 6B:
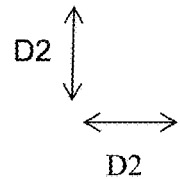
Figure 6B:
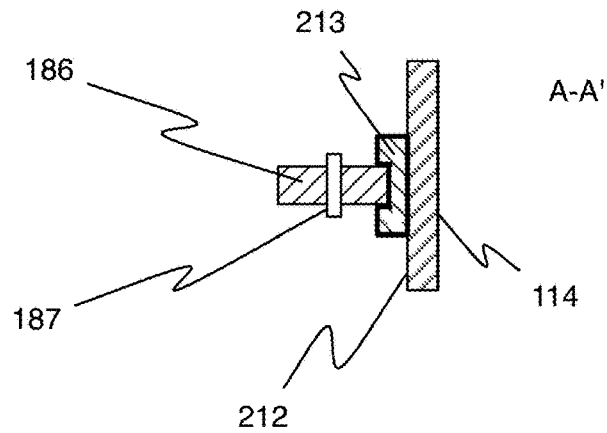

FIG. 6B illustrates a cross-sectional view from FIG. 6A, along the line A-A'. It shows the cylindrical body 114 and a bearing wheel or roller 186. A raceway 213 has been arranged on the inner surface 212 of the cylindrical body 114, for allowing movement of the bearing wheel or roller 186. The FIG. further shows the axis 187 of the bearing wheel or roller 186. Steps of a method of installing the at least one Magnus-type rotor 108 in accordance with an exemplary embodiment of the present disclosure will now be explained in conjunction with FIGS. 5A to 5B. In FIG. 5A, there are depicted events S5.1 through S5.3, while there are depicted in FIG. 5B events S5.4 to S5.5 encountered during the exemplary method. In the event S5.1, the support tower 164 is positioned in axial alignment, preferably to the bearing receptacle 180, and lowered down onto the foundation 112. Moreover, the bearing wheels or rollers 186 of the second bearing arrangement 176 are maintained in a retracted state and hence, shown positioned within the support tower 164.

In the event S5.2, the support tower 164 is shown mounted on the bearing receptacle 180. At this point, the support tower 164 is beneficially rigidly connected to the foundation 112 by bolts (not shown). Moreover, the bearing wheels or rollers 186 are continued to be kept in the retracted state, namely within the support tower 164.

In the event S5.3, the cylindrical body 114 is co-axially positioned relative to the input shaft 162 of the support tower 164 and lowered thereon. In an exemplary embodiment shown in the event S5.3 of FIG. 5A, the cylindrical body 114 optionally further includes a pair of stoppers 191 configured to abut the support plate 124.

Referring to FIG. 5B, attention is particularly drawn to the event S5.4. The pair of stoppers 191 is shown in abutment with the support plate 124. The stoppers 191 together with the support plate 124 are configured to prevent further axial movement of the cylindrical body 114 relative to the support tower 164 in a downward direction. Next, the stoppers 191 are beneficially bolted to the support plate 124 for accomplishing a rigid connection therebetween. Thereafter, the bearing wheels or rollers 186 are beneficially moved from their retracted state, as indicated by a pair of horizontal arrows.

In the event S5.5 of FIG. 5B, the bearing wheels or rollers 186 are shown partially outwards relative to the support tower 164, and in contact with the inner surface 212 of the cylindrical body 114. In such a manner, the Magnus-rotor 108 is beneficially assembled onto the deck region 110 of the aquatic vessel 100. However, it will be appreciated that the foregoing events S5.1 through S5.3 disclose an exemplary sequence of steps of assembly. Other methods of assembly are also feasible, pursuant to the present disclosure. For example, it is feasible to bolt the stoppers 191 of the cylindrical body 114 to the support plate 124 before lowering the Magnus-type rotor 108 in its entirety onto the foundation 112.

It will be appreciated that the events S5.1 to S5.5 are to be construed only in an illustrative and explanatory sense since other alternatives can also be envisioned where one or more steps are added, one or more steps are removed, or one or more steps are provided in a different sequence without departing from the scope of the claims herein.

FIGS. 5A and 5B are merely examples, which should not unduly limit the scope of the claims herein. It is to be understood that the specific designation for the events of assembly is for exemplary purposes and is not to be construed as limiting the assembly process to specific numbers, types, or sequence of arrangement of components of the Magnus-type rotor 108. A person skilled in the art would recognize many variations, alternatives, and modifications of embodiments of the present disclosure.

Figure 7:
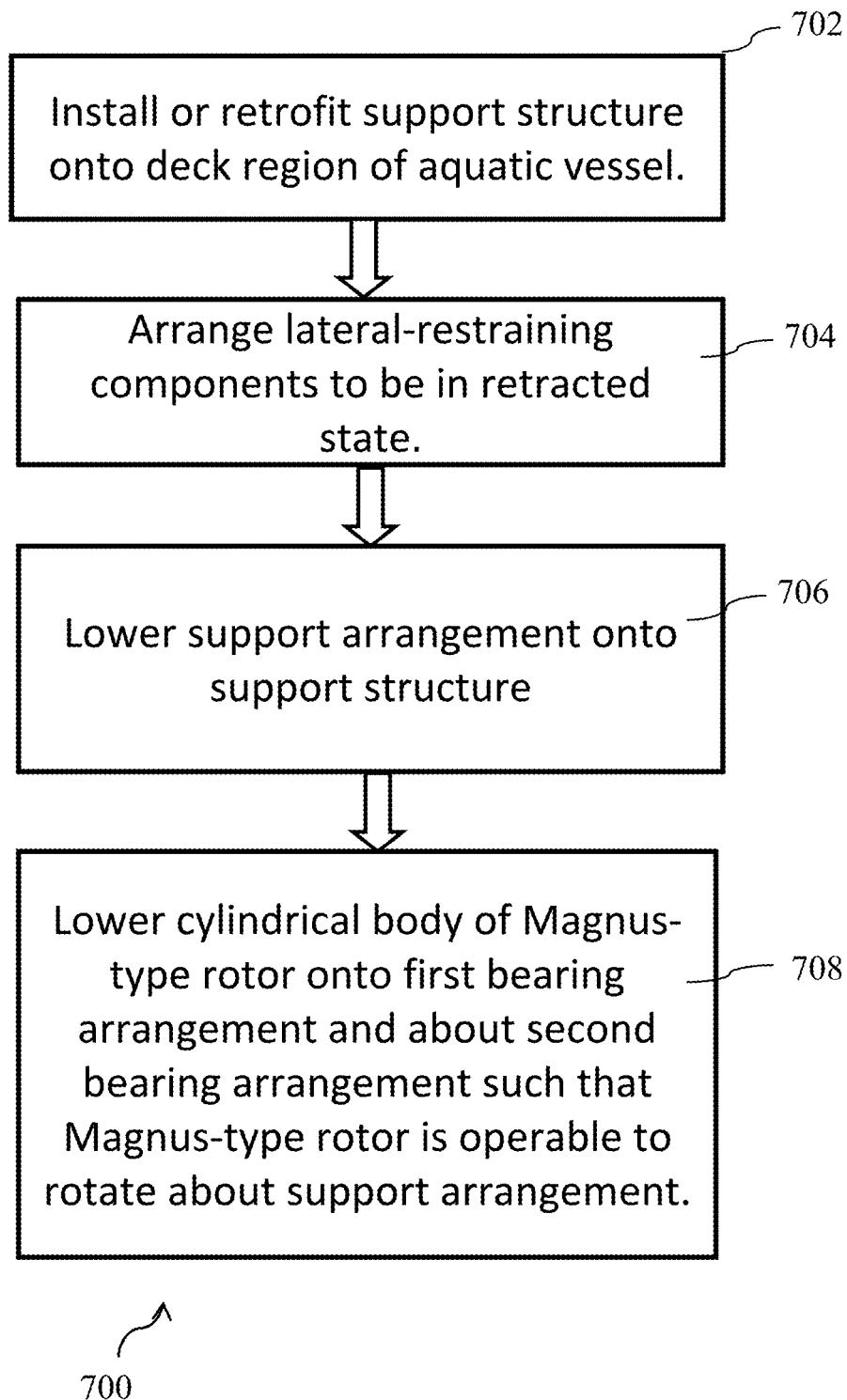
FIG. 7 is a series of steps of a method of installing a propulsion system.

In FIG. 7, there are illustrated steps of a method 700 of installing the propulsion system 102 into the aquatic vessel 100 in accordance with an embodiment of the present disclosure. At a step 702, the method 700 includes installing or retrofitting a support structure, namely the foundation 112, onto the deck region 110 of the aquatic vessel 100, wherein the support structure includes the first bearing arrangement 172 disposed above the second bearing arrangement 176. As disclosed earlier herein, the first bearing arrangement 172 is operable to accommodate pivotal motion of the cylindrical body 114 about the support tower 164 while substantially bearing downwardly-directed forces, namely a weight of the cylindrical body 114. The second bearing arrangement 176 is operable to restrain lateral motion of the cylindrical body 114 relative to the support tower 164 and hence, bear lateral forces.

At a step 704, the method 700 further includes a step of arranging lateral-restraining components, namely the bearing wheels or rollers 186 of the second bearing arrangement 176, to be in a retracted state to enable the support arrangement 118 to be installed into the aquatic vessel 100. As disclosed earlier herein, the second bearing arrangement 176 is beneficially associated with the foundation 112 on the deck region 110 of the aquatic vessel 100. However, the second bearing arrangement 176 is optionally alternatively located within the support tower 164 and hence associated with the support arrangement 118.

At a step 706, the method 700 further includes lowering the support arrangement 118 into the support structure, namely the foundation 112, for engaging with the bearing receptacle 180. Beneficially, the second bearing arrangement 176 is arranged to be in a non-retracted state such that the second bearing arrangement 176 is configured to engage onto the lower end 184 of the cylindrical body 114 of the at least one Magnus-type rotor 108.

At a step 708, the method 700 further includes lowering the cylindrical body 114 of the at least one Magnus-type rotor 108 onto the first bearing arrangement 172 and about the second bearing arrangement 176, such that the at least one Magnus-type rotor 108 is operable to rotate about the support arrangement 118.

It will be appreciated that the steps 702 to 708 are only illustrative and other alternatives are optionally provided where one or more steps are added, one or more steps are removed, or one or more steps are provided in a different sequence without departing from the scope of the claims herein.

Embodiments of the present disclosure can be used for various purposes, including, though not limited to, enabling more easy installation of the Magnus-type rotor 108 onto the deck region 110 of the aquatic vessel 100, while providing improved ease of access to service personnel for accessing the motor 148 and/or other internal components of the Magnus-type rotor 108. Moreover, embodiments of the present disclosure can be implemented for providing adequate ventilation and/or cooling to the drive arrangement 147 and/or other components located within the Magnus-type rotor 108 to prolong a service life of the drive arrangement 147 and/or other components.

Figure 8:
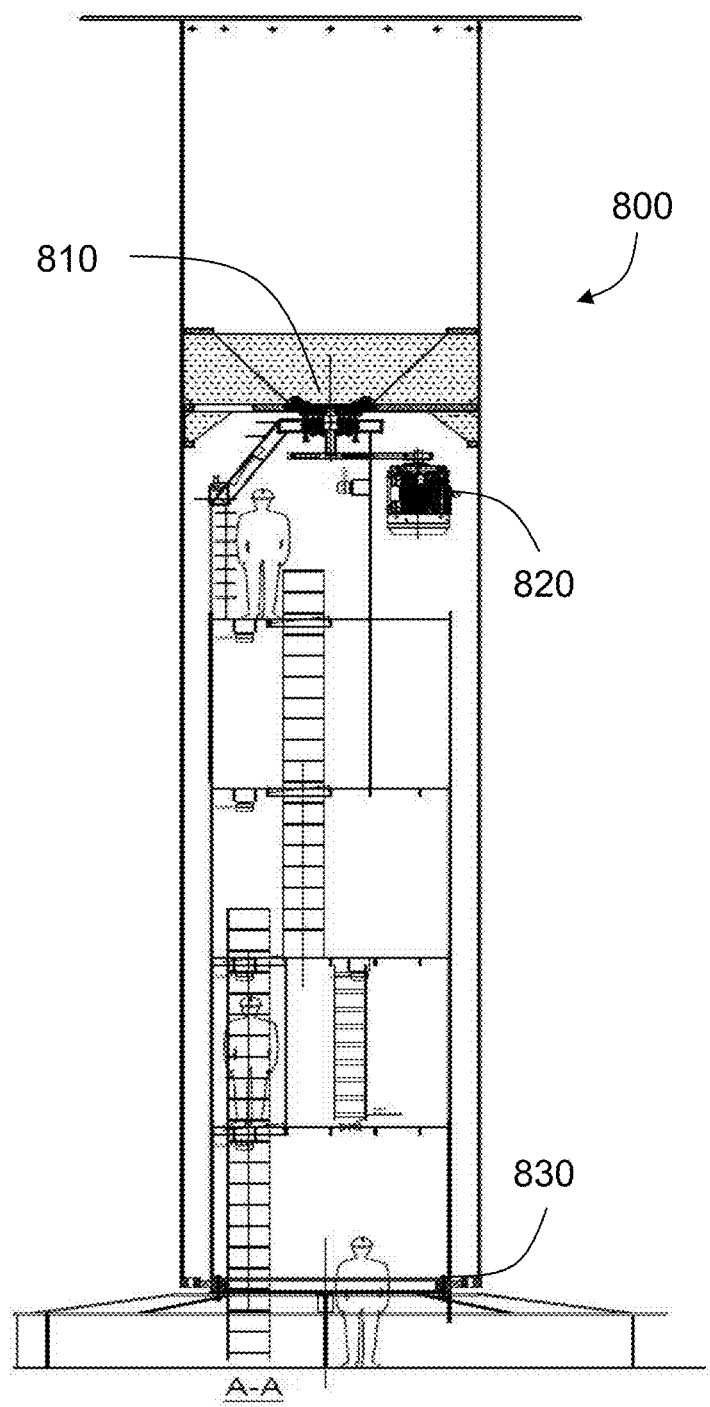
FIG. 8 is an illustration of an alternative implementation of a Magnus-type rotor pursuant to the present disclosure having a vertical-direction loading bearing arrangement at an upper region, together with a drive motor included within the Magnus-type rotor and accessible to personnel via an arrangement of ladders, and a lateral bearing arrangement at a lower region of the Magnus-type rotor.
Figure 9:
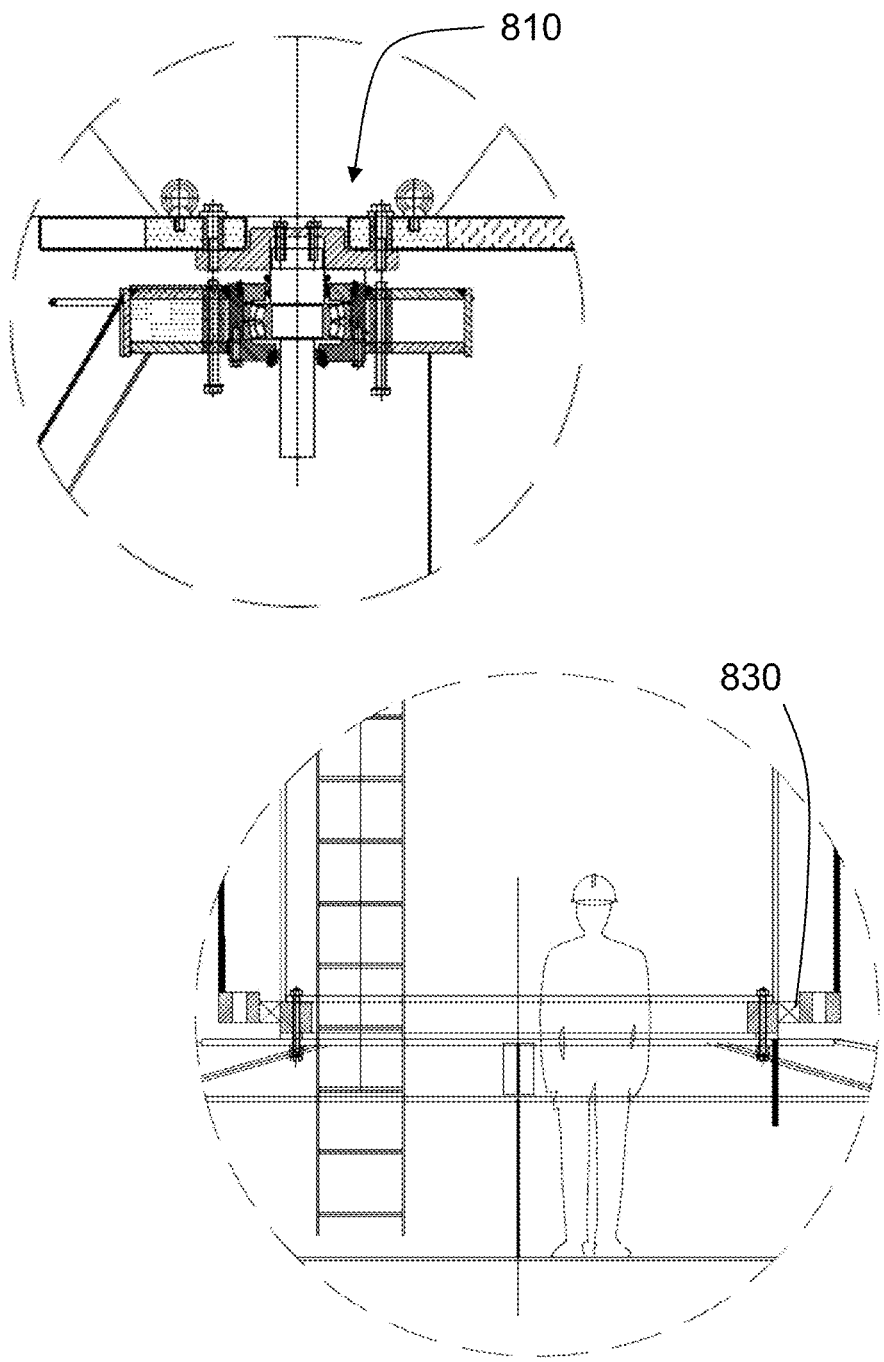
FIG. 9 is a more detailed illustration of the vertical-direction loading bearing arrangement of FIG. 8, and also a more detailed illustration of the lateral bearing arrangement of FIG. 8.

Referring next to FIG. 8 and FIG. 9, there is shown an alternative implementation of a Magnus-type rotor indicated generally by 800. The Magnus-type rotor 800 includes a first bearing arrangement 810 at a generally upper portion of the rotor 800 for bearing a vertical downwards directed force arising primarily from a weight of the rotor 800 as well as restraining the rotor 800 in lateral directions, and a second bearing arrangement at a generally lower portion of the rotor 800 for bearing lateral forces generated by the rotor 800. An inner region of the rotor 800 is hollow for accommodating a support arrangement including an arrangement of ladders for enabling personnel to access a motor 820 located at the upper portion of the rotor 800. Optionally, the motor 820 is provided with a cog wheel on its rotating shaft to drive a relatively larger cogwheel of the rotor 800, wherein the cogwheel of the rotor 800 is beneficially disposed substantially immediately below the first bearing arrangement 810. The rotor 800 is provided with a broad plinth, for example having an external diameter in a range of 1.5 to 3 times that of the rotor 800, which is susceptible to being mounted, or coupled integrally, with an upper deck of an aquatic vessel, for example the aquatic vessel 100.

Figure 10:
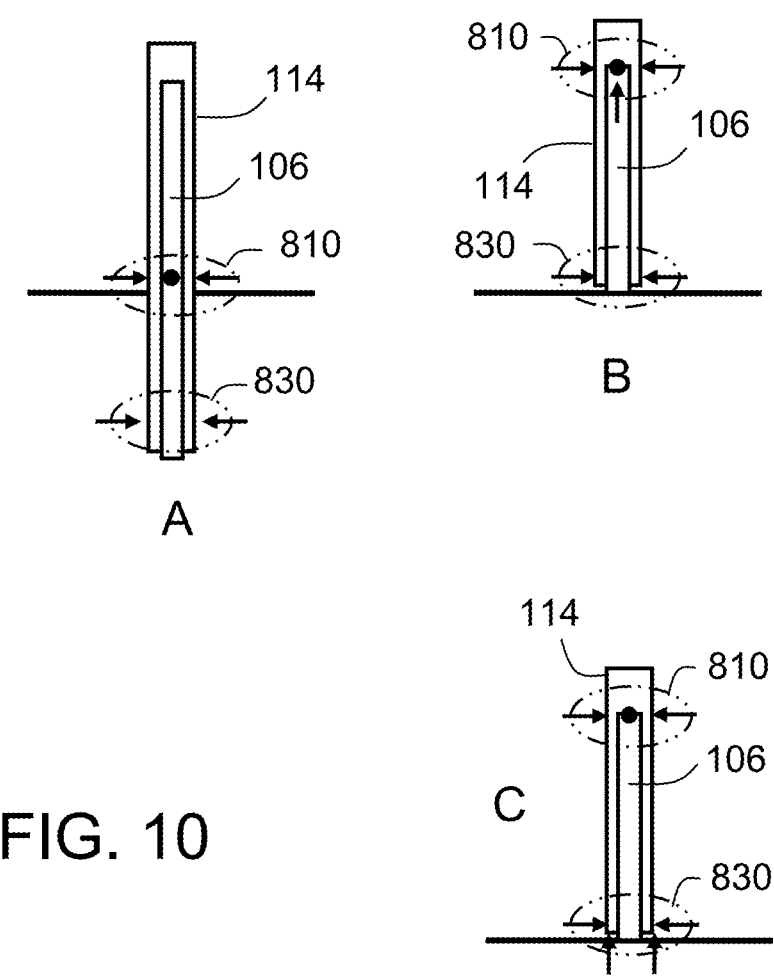
FIG. 10 is an illustration of alternative example bearing configurations for use with the propulsion system of FIG. 1.

It will be appreciated that the first and second bearing arrangements 810, 830 respectively are optionally implemented in alternative configurations, as illustrated in FIG. 10. In a configuration "A", the first bearing arrangement 810 allows pivoting of the rotor 114, whilst restraining the rotor 114 in lateral direction; the second bearing arrangement 830 is operable to restrain lateral motion as a lower end of the rotor 114. In a configuration "B", a weight of the rotor 114 is carried by the first bearing arrangement 810 which allows pivoting, but provides lateral restraint; the second bearing arrangement 830 is operable to restrain movement of the rotor 114 in lateral directions. In a configuration "C", the first bearing arrangement is operable to restrain lateral movement of the rotor 114, whereas the second bearing arrangement 830 is operable to support a weight of the rotor 114 and to restrain lateral movement of a lower end of the rotor 114. Other implementations of the first and second bearing arrangement 810, 830 are feasible pursuant to the present disclosure.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A propulsion system for an aquatic vessel, wherein the propulsion system includes at least one Magnus-type rotor including a cylindrical body, which Magnus-type rotor is configured to rotate about a corresponding substantially upright axis, a drive arrangement for rotating the at least one Magnus-type rotor, and a control arrangement for controlling the drive arrangement for varying rates of one or more of rotation or direction of the at least one Magnus-type rotor, wherein the at least one Magnus-type rotor includes a hollow region therein, and is rotationally supported onto a support arrangement which extends into the hollow region, and at least one motor of the drive arrangement for rotating the at least one Magnus-type rotor is included in the hollow region and lies outside the support arrangement, and the at least one motor is accessible for maintenance, and the at least one Magnus-type rotor includes a ventilation aperture arrangement in the upper region of the rotor for enabling an upward movement of air into and out of the cylindrical body to occur in operation within the at least one Magnus-type rotor for ventilating and cooling one or more of the drive arrangement or other internal components;

wherein the at least one Magnus-type rotor is elongate and includes an upper portion which is supported onto a first bearing arrangement disposed between the at least one Magnus-type rotor and the support arrangement, and a lower end of the support arrangement is connected to a foundation installed on a deck region of the aquatic vessel; and the first bearing arrangement includes at least two sets of roller bearings, wherein the sets of roller bearings have their axes of rotation angularly disposed so as to enable pivoting of the at least one Magnus-type rotor in operation about the first bearing arrangement, but substantially hindering lateral movement of the at least one Magnus-type rotor relative to the support arrangement.

2. A propulsion system as claimed in claim 1, wherein the at least one motor is coupled via a belt drive, chain drive or a gear arrangement to the at least one Magnus-type rotor for rotating the at least one Magnus-type rotor in operation to propel the aquatic vessel.

3. A propulsion system as claimed in claim 1, wherein the first bearing arrangement is configured to bear a majority of a weight of the at least one Magnus-type rotor, and a second bearing arrangement is configured to restrain lateral movement of a lower end of the Magnus-type rotor, such that the at least one Magnus-type rotor is configured to be able to pivot about the first bearing arrangement.

4. A propulsion system as claimed in claim 3, wherein the second bearing arrangement includes a configuration of resiliently-mounted bearing wheels which are retractable for enabling the Magnus-type rotor to be installed onto and removed from the support arrangement.

5. A propulsion system as claimed in claim 1, wherein the at least one Magnus-type rotor has a diameter in a range of 2.5 meters to 7.0 meters, and a height in a range of 15 meters to 40 meters.

6. A propulsion system as claimed in claim 1, wherein the at least one motor of the drive arrangement is configured to supply in a range of 50 kW to 300 kW mechanical drive power to the at least one Magnus-type rotor when the propulsion system is employed to propel the aquatic vessel.

7. A propulsion system as claimed in claim 1, wherein the at least one Magnus-type rotor includes one or more of ventilation blades or a plurality of apertures allowing exchange of the upward movement of air and/or at least one service opening at an upper region thereof.

8. A propulsion system according to claim 1 for an aquatic vessel, wherein the propulsion system includes at least one Magnus-type rotor which is configured to rotate about a corresponding substantially upright axis, a drive arrangement for rotating the at least one Magnus-type rotor, and a control arrangement for controlling the drive arrangement for varying rates of rotation of the at least one Magnus-type rotor, wherein a support arrangement is elongate and includes a lower portion which is supported onto a foundation on a deck region of the aquatic vessel.

9. A propulsion system as claimed in claim 8, wherein a first bearing arrangement is configured to bear a majority of a weight of the at least one Magnus-type rotor, and a second bearing arrangement is configured to restrain lateral movement of the lower end of the support arrangement, such that the at least one Magnus-type rotor is configured to be able to pivot about the first bearing arrangement.

10. A propulsion system as claimed in claim 9, wherein the second bearing arrangement includes a configuration of resiliently-mounted bearing wheels which are retractable for enabling the Magnus-type rotor to be installed onto and removed from the support arrangement.

11. A propulsion system as claimed in claim 10, wherein the configuration of resiliently-mounted bearing wheels includes one or more wheels or rollers which are rotatably mounted onto adjustable arms.

12. A propulsion system as claimed in claim 9, wherein the first bearing arrangement includes two sets of roller bearings wherein the sets of roller bearings have their axes of rotation angularly disposed so as to enable pivoting of the at least one Magnus-type rotor in operation about the first bearing arrangement, but substantially hindering lateral movement of the at least one Magnus-type rotor relative to the support arrangement.

13. A propulsion system as claimed in claim 8, wherein the at least one Magnus-type rotor includes a hollow region therein, and is rotationally supported onto the support arrangement which extends into the hollow region, and at least one motor of the drive arrangement for rotating the at least one Magnus-type rotor is included in the hollow region and lies outside the support arrangement, wherein the at least one motor is accessible for maintenance.

14. A method of installing a propulsion system according to claim 1 into an aquatic vessel, wherein the propulsion system includes at least one Magnus-type rotor including a cylindrical body, which Magnus-type rotor includes a ventilation arrangement in the upper region of the rotor for enabling an upward movement of air into and out of the cylindrical body to occur in operation within the at least one Magnus-type rotor for ventilating and cooling the drive arrangement and/or other internal components and which rotor is configured to rotate about a corresponding substantially upright axis, a drive arrangement for rotating the at least one Magnus-type rotor, and a control arrangement for controlling the drive arrangement for varying rates of rotation of the at least one Magnus-type rotor, wherein the method includes:
 (i) installing or retrofitting a foundation onto a deck region of the aquatic vessel;
 (ii) installing or retrofitting onto the foundation a support structure including a first bearing arrangement above a second bearing arrangement, wherein the first bearing arrangement is configured to accommodate pivotal motion, and the second bearing arrangement is configured to accommodate lateral motion, and wherein the first bearing arrangement is configured substantially to bear downwardly-directed forces and the second bearing arrangement is configured substantially to bear lateral forces;
 (iii) arranging lateral-restraining components of the second bearing arrangement to be in a retracted state;
 (iv) lowering the at least one Magnus-type rotor onto the first and second bearing arrangements disposed in association with the support arrangement, so that the at least one Magnus-type rotor is configured to rotate about the support arrangement; and
 (v) arranging for the second bearing arrangement to be in a non-retracted state so as to engage onto a lower end of the Magnus-type rotor.

15. A method as claimed in claim 14, wherein the method includes coupling at least one motor of the drive arrangement between the at least one Magnus-type rotor and the support arrangement for rotating in operation at least one Magnus-type rotor relative to the support arrangement, wherein the at least one Magnus-type rotor includes a hollow region therein, and is rotationally supported onto a support arrangement which extends into the hollow region, and at least one motor of the drive arrangement for rotating the at least one Magnus-type rotor is included in the hollow region and lies outside the support arrangement, wherein the at least one motor is accessible for maintenance.

16. A method as claimed in claim 14, wherein the method includes engaging the second bearing arrangement by one or more pivotally or laterally or radially moving a configuration of bearing wheels from a retracted state to an engaged state, wherein the bearing wheels engage onto a lower end of the at least one Magnus-type rotor.

* * * * *